Sept. 16, 1958 D. GUGLIOTTA 2,851,813
FISHING ROD HOLDERS
Filed June 28, 1955 2 Sheets-Sheet 1
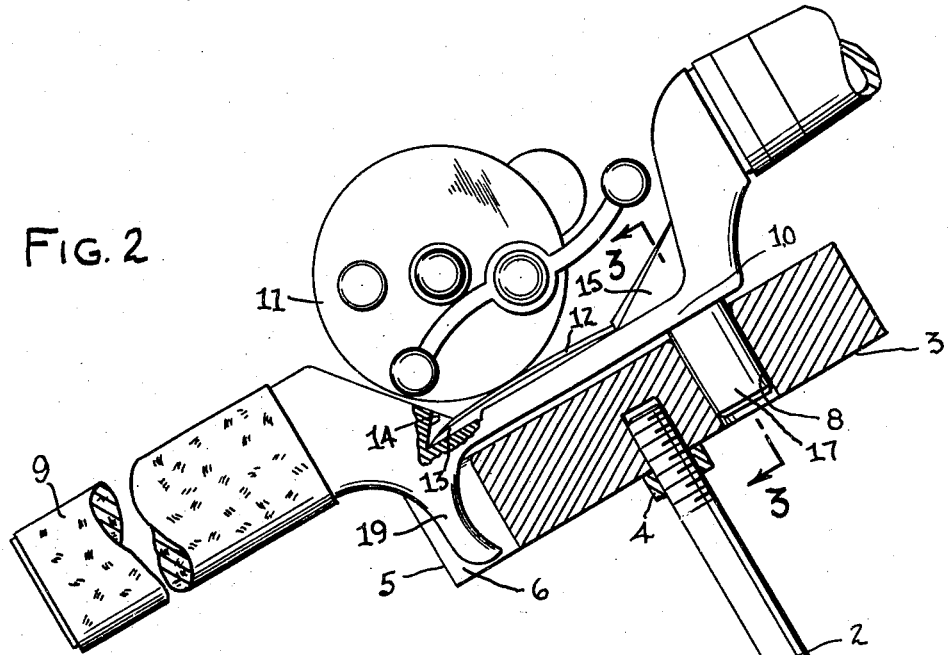
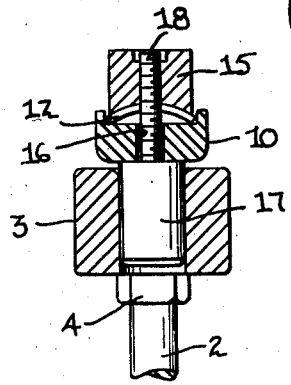
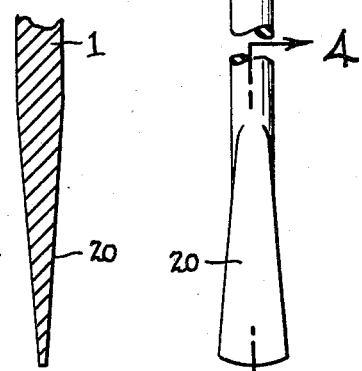
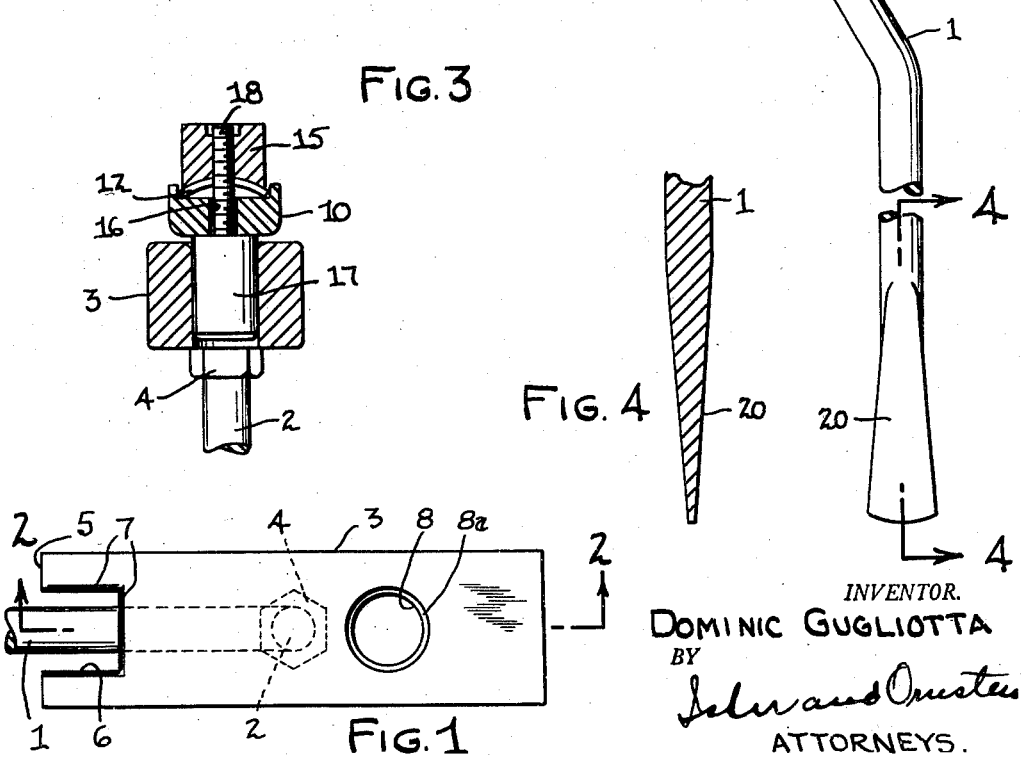
INVENTOR.
DOMINIC GUGLIOTTA
BY
ATTORNEYS.

Sept. 16, 1958      D. GUGLIOTTA      2,851,813
FISHING ROD HOLDERS
Filed June 28, 1955      2 Sheets-Sheet 2
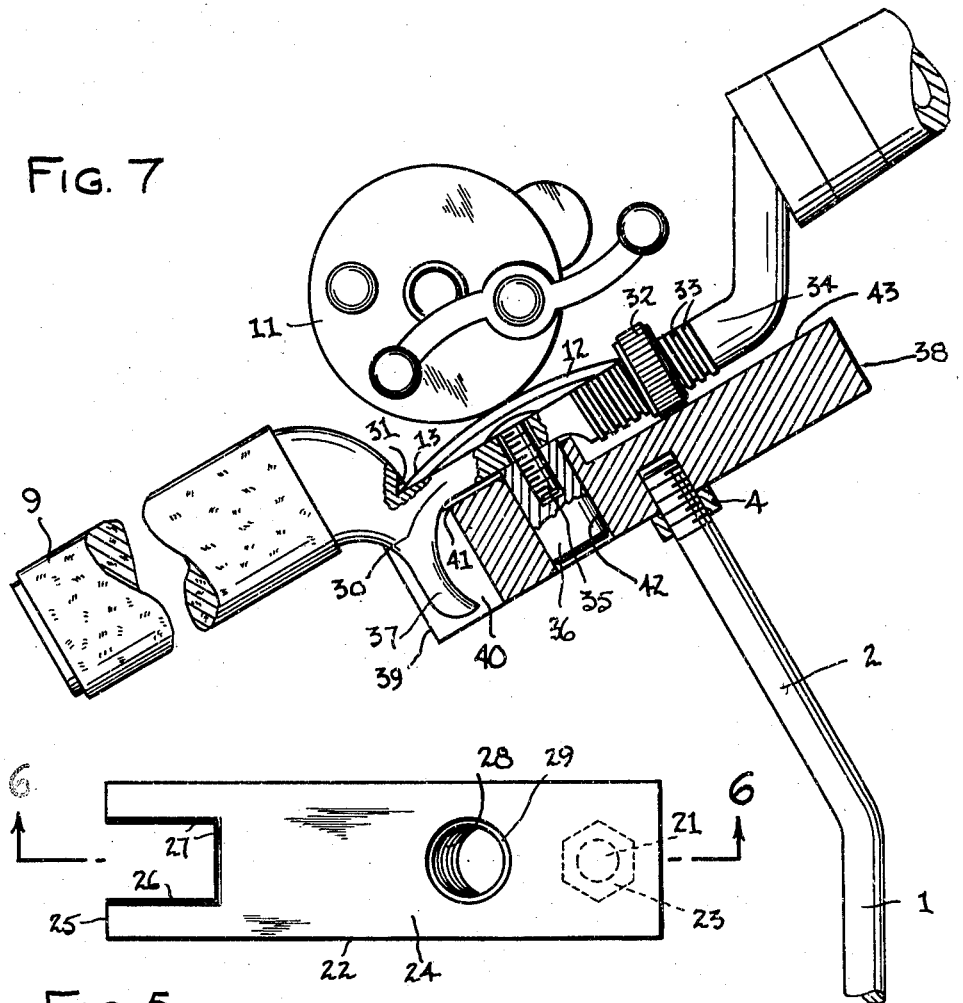
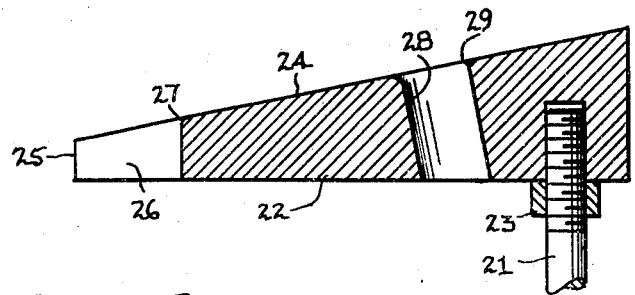
INVENTOR.
DOMINIC GUGLIOTTA
BY
ATTORNEYS.

United States Patent Office 2,851,813
Patented Sept. 16, 1958

2,851,813

FISHING ROD HOLDERS

Dominic Gugliotta, Maple Heights, Ohio

Application June 28, 1955, Serial No. 518,560

3 Claims. (Cl. 43—21.2)

This invention relates generally to fishing rod holders, but has reference more particularly to holders which are designed especially for use in connection with certain conventional types of fishing rods.

A primary object of the invention is to provide a holder of the character described, which is effective to maintain a fishing rod in a desired angular position when left temporarily unattended, and without danger of accidental displacement of the rod from the holder.

Another object of the invention is to provide a holder of the character described, which does not require the use of clamps or similar devices for securing the rod to the holder, which devices require considerable adjustment and manipulation.

A further object of the invention is to provide a holder of the character described, which is extremely simple and inexpensive in construction, and from which the fishing rod can be quickly and easily detached by a simple upward movement in a direction perpendicular to the holder.

Other objects and advantages of my invention will be apparent during the course of the following description.

In the accompanying drawings forming a part of this specification and in which like numerals are employed to designate like parts throughout the same.

Fig. 1 is a top plan view, of one form of fishing rod holder, embodying the invention;

Fig. 2 is a cross-sectional view, taken on the line 2—2 of Fig. 1, and showing a fishing rod, supported on the holder;

Fig. 3 is a fragmentary cross-sectional view, taken on the line 3—3 of Fig. 2;

Fig. 4 is a fragmentary cross-sectional view, taken on the line 4—4 of Fig. 2;

Fig. 5 is a view similar to Fig. 1, but showing a modification of the holder;

Fig. 6 is a cross-sectional view, taken on the line 6—6 of Fig. 5;

Fig. 7 is a view similar to Fig. 2, but showing another modification of the invention.

Referring more particularly to Figs. 1 to 4 inclusive of the drawings, there is disclosed a standard 1 which is adapted to be pushed partially into the ground, and is provided at its upper end with an angulated portion 2, the upper end of which is threaded for connection to a support block or base 3. A lock nut 4 is provided, which is threadedly secured to the angulated portion 2 of the standard and which bears against the lower surface of the block 3 to lock the block 3 against rotation relatively to the portion 2 of the standard.

The block 3 is of rectangular contour and of substantially uniform thickness from end to end, and is provided in its rear edge 5 with a recess 6, of substantially square transverse cross-section, the walls of this recess being rounded at their upper ends, as at 7.

At a point spaced forwardly from the axis of the angulated portion 2 of the standard, the block 3 is provided with a smooth-walled bore 8, which is disposed centrally transversely of the block, and the axis of which is substantially parallel with the axis of the portion 2 of the standard. The wall of the upper end of the bore 8 is also rounded, as at 8a.

Reference numeral 9 designates the hand grip of a conventional fishing rod having an offset portion 10 which is adapted to overlie the block 3 in the manner shown. The offset portion 10 of the rod is adapted for the reception of a reel 11, which is conventionally provided with an arched base 12, which rests on the portion 10 of the rod, and has its rear end 13 disposed in a notch 14 of the portion 10 and its front end removably clamped to the portion 10 by a clamp piece 15. The clamp piece 15 is conventionally secured to the portion 10 by means of a screw (not shown) which extends through an opening 16 in the portion 10 and is threadedly secured to the piece 15. In this case, however, such a screw is not used, but instead, the clamp piece 15 is secured to the portion 10 by means of a dowel pin 17 of substantially the same length and diameter as the bore 8 of the block 3, the dowel pin having a threaded extension 18 which extends through the opening 16 and is threadedly secured to the clamp piece 15, so that the dowel pin has a two-fold function. One of these functions is to clamp the clamp piece 15 to the offset portion 10 of the holder. The other function is to provide a dowel which extends into the bore 8 and thus locks the fishing rod against displacement from the block 3 both longitudinally and transversely.

The portion 10 of the fishing rod is also provided with a conventional finger grip 19 which is adapted to enter the recess 6 of the block 3 in the manner shown, so that the side walls of this recess prevent the portion 10 of the fishing rod from rotating about the axis of the bore 8.

The combination of the bore 8 and recess 6 thus effectively prevent displacement of the portion 10 from the block 3 in a longitudinal or transverse direction, without requiring that the fishing rod be clamped in any way to the block. At the same time, the fishing rod can be quickly and easily detached from the block 3 by a simple upward movement of the portion 10 from the block in a direction perpendicular to the block. The rounded portion 7 of the recess 6, and the rounded portion 8a of the bore 8, facilitate re-entry of the finger grip 19 and dowel pin 17 into the block 3.

It is thus seen that I have provided an extremely simple and inexpensive fishing rod holder, which enables the fisherman to leave the rod unattended for short periods during fishing, and which is free from complicated clamps and other devices which require considerable adjustment and manipulation.

It will be noted that when the standard 1 is in a vertical position, the block 3, and consequently the fishing rod, is supported at the proper angular position for fishing, that is to say, the support holds the fishing rod at substantially the same inclination that the fisherman would normally hold the rod in his hand.

By flattening the lower end of the standard 1, to provide a poker end 20, this end, when stuck into the ground, will prevent the standard 1 from rotating about its axis, and thus will aid in maintaining the block 3 and fishing rod in a fixed position.

In Figs. 5 and 6, a modification of the invention is shown, in which the standard 21 is not provided with an angulated upper end, but has its upper end threaded for connection to a support block or base 22, adjacent the forward end of the latter. A lock nut 23 is provided, which is threadedly secured to the standard 21 and which bears against the lower surface of the block 22 to lock the block against rotation relatively to the standard.

The block 22 is of substantially rectangular contour, but its upper flat surface 24 is inclined relatively to the bottom surface of the block, so as to provide a downwardly and rearwardly inclined surface for supporting a fishing rod at a desired angle. The block 22 is provided in its rear edge 25 with a recess 26 of substantially rectangular cross-section, the walls of this recess being rounded at their upper ends as at 27.

At a point spaced rearwardly from the axis of the standard 21, the block 22 is provided with a smooth-walled bore 28, which is disposed centrally transversely of the block, and the axis of which is substantially perpendicular to the upper surface 24 of the block. The wall of the upper end of the bore 28 is also rounded, as at 29.

The upper surface of the block 22 supports the offset portion 10 of the fishing rod in the same manner that the block 3 supports such a fishing rod, the bore 28 receiving the dowel pin 17 and the recess 26 receiving the finger grip 19.

The functions and advantages of the block 22 are thus precisely the same as those of the block 3, and need not, therefore, be repeated.

In Fig. 7, another modification of the holder is shown, which is adapted for use in connection with another conventional type of fishing rod, but which is different, in some respects from that described in relation to the first two forms of the invention. Such a fishing rod is provided with an offset portion 30 which receives the reel 11, and a notch 31 which receives the rear end 13 of the arched base 12 of the reel. The front end of the arched base 12 is adapted to be removably clamped to the portion 30 by means of an adjustable ring 32 which is threadedly connected to interrupted threads 33 on a portion 34 of the rod which is of substantially semi-circular cross-section. Secured to the portion 30 of the fishing rod, at a point directly below the longitudinal center of the base 12, as by means of a screw 35, is a dowel pin 36 similar to the dowel pin 17. The portion 30 of the fishing rod is also provided with the conventional finger grip 37, which, in this case, is considerably closer to the dowel pin 37 than is the finger grip 19 to the dowel pin 17.

The support block 38, in this case, is somewhat similar to the block 3, and is provided in its rear edge 39 with a recess 40, of substantially square transverse cross-section, the walls of this recess being rounded at their upper ends, as at 41.

At a point spaced rearwardly from the axis of the angulated portion 2 of the standard 1, the block is provided with a smooth-walled bore 42, which is disposed centrally transversely of the block, and the axis of which is substantially parallel with the axis of the portion 2 of the standard.

The upper surface of the block 38 supports the offset portion 30 of the rod, the bore 42 receiving the dowel pin 36, and the recess 40 receiving the finger grip 37. Immediately forwardly of the bore 42, a portion of the block 38 is removed, as at 43, to provide a space for accommodating the depending portion 34 of the rod.

The function and advantages of the block 38 are thus substantially the same as those of the blocks 3 and 22, and need not, therefore, be repeated.

It is to be understood that the forms of my invention, herewith shown and described, are to be taken as preferred examples of the same, and that various changes in the shape, size, and arrangement of parts may be resorted to, without departing from the spirit of my invention, or the scope of the subjoined claims.

Having thus described my invention, I claim:

1. In combination, a fishing rod having an offset handle portion provided with a depending round dowel pin and a finger grip, a support for said offset handle, said support comprising a block having a round bore extending therethrough for snug reception of said dowel pin, and a recess in the rear end of said block for reception of said finger grip, said dowel pin having no portion of greater diameter than the diameter of said bore, whereby the fishing rod may be lifted from said support without requiring detachment of the dowel pin from the fishing rod.

2. In combination, a fishing rod having an offset handle portion adapted to receive a reel, a ring threadedly secured to said handle portion and adapted to be adjusted therealong to clamp said reel to said handle portion, said handle portion having a finger grip spaced from said ring, a dowel pin removably secured to said handle portion at a point intermediate said ring and finger grip, and a support for said offset handle portion, said support having a bore extending therethrough for reception of said dowel pin, and a recess in the rear end of said block for reception of said finger grip.

3. In combination, a fishing rod having an offset handle portion provided with a finger grip and a dowel pin extending below said offset handle, said dowel pin being of uniform diameter throughout the length thereof, a support for said offset handle, said support comprising a block having a round bore extending therethrough and of a diameter substantially the same as said uniform diameter of said dowel pin, whereby the dowel pin may be disposed in said bore and the fishing rod lifted from said support without requiring removal of the dowel pin from the handle, said support block also having in its rear end a recess for the reception of said finger grip.

References Cited in the file of this patent

UNITED STATES PATENTS

| | | |
|---|---|---|
| 965,826 | Lynch | July 28, 1910 |
| 1,719,695 | Ferguson | July 22, 1929 |
| 2,184,192 | McCline et al. | Dec. 19, 1939 |
| 2,443,762 | Boal | June 22, 1948 |
| 2,448,752 | Wagner | Sept. 7, 1948 |
| 2,485,144 | Espenship | Oct. 18, 1949 |
| 2,519,851 | Reynolds | Aug. 22, 1950 |